United States Patent [19]

Bosma

[11] Patent Number: 4,945,780
[45] Date of Patent: Aug. 7, 1990

[54] DRIVE UNIT FOR A MONORAIL CARRIER

[75] Inventor: Marinus A. Bosma, Tipp City, Ohio

[73] Assignee: Bosma Machine and Tool Corporation, Tipp City, Ohio

[21] Appl. No.: 335,562

[22] Filed: Apr. 10, 1989

[51] Int. Cl.$^5$ .............................................. F16H 5/08
[52] U.S. Cl. .................................... 74/337.5; 104/93; 192/89 A
[58] Field of Search .................. 74/337.5, 405, 406, 74/473 R; 192/1.39, 93 R, 93 B, 89 A; 104/93, 118; 105/141, 148

[56] References Cited

U.S. PATENT DOCUMENTS

| | | | |
|---|---|---|---|
| 3,625,158 | 12/1971 | Lorenz et al. | 104/93 |
| 3,837,409 | 9/1974 | Consoli et al. | 192/89 A X |
| 4,014,221 | 3/1977 | Eastwood | 74/405 X |
| 4,038,883 | 8/1977 | Jones | 74/337.5 |
| 4,307,795 | 12/1981 | Roy | 192/89 A X |
| 4,373,601 | 2/1983 | Onda et al. | 74/337.5 X |
| 4,455,884 | 6/1984 | Tsuruta et al. | 74/337.5 X |
| 4,545,303 | 10/1985 | Fujita et al. | 192/1.39 X |
| 4,579,204 | 4/1986 | Iio | 192/93 R X |

Primary Examiner—Dwight Diehl
Attorney, Agent, or Firm—Jacox & Meckstroth

[57] ABSTRACT

A housing supports input and output shafts disposed at right angles, and the shafts are connected by a set of reduction gears and a spring biased clutch sleeve splined to the output shaft for axial movement. An electric motor is flange mounted on the housing and has a motor shaft connected to the input shaft which is surrounded by an electrically actuated brake effective to brake the input shaft to the housing. A shift lever operates a control shaft which extends into the housing parallel to the output shaft, and the control shaft supports a rotary cam which moves a spring biased clutch yoke for shifting the clutch sleeve between positive engaged and disengaged positions with respect to a drive gear rotatably supported by the output shaft. The rotary cam provides for spring biased overtravel of the lever operated control shaft and over center action between the engaged and disengaged positions. A solenoid is mounted on the housing and is connected by a lever actuated rod to shift the control shaft and cam axially for also engaging and disengaging the clutch sleeve.

14 Claims, 3 Drawing Sheets

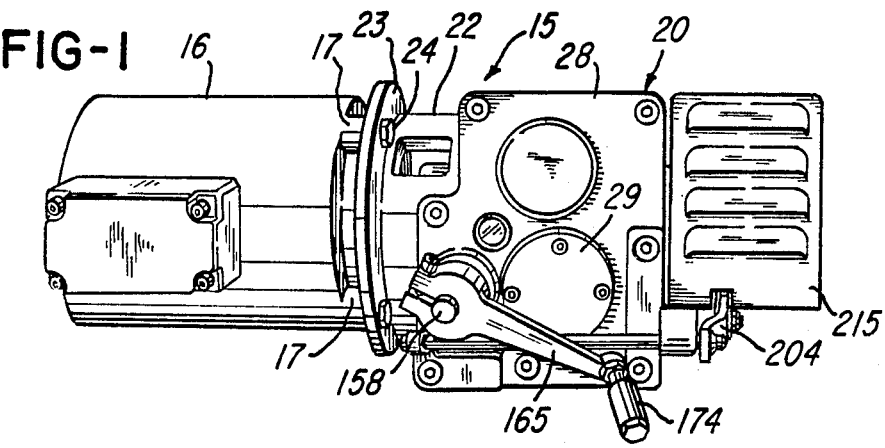
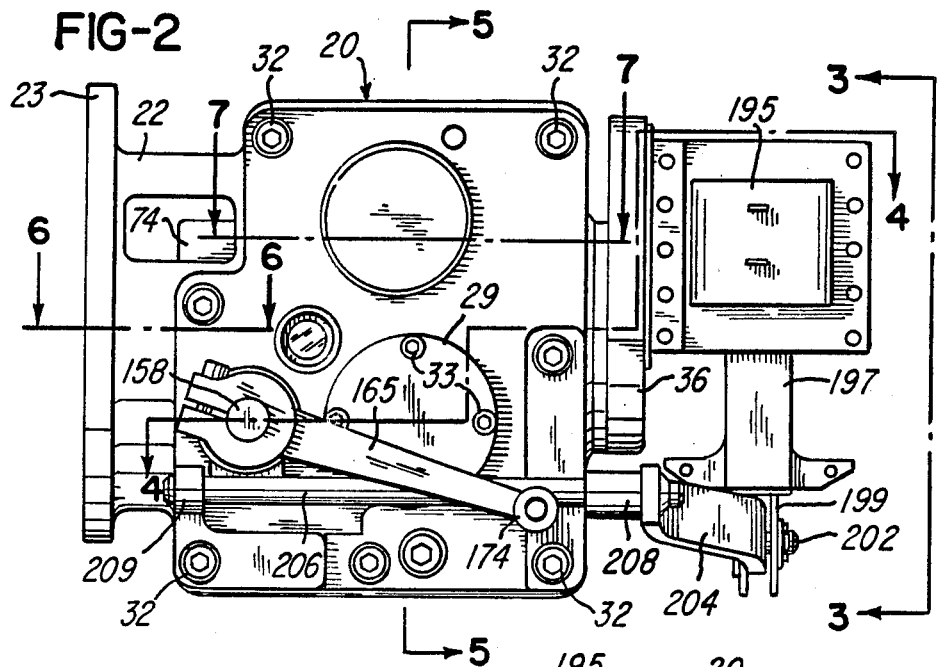
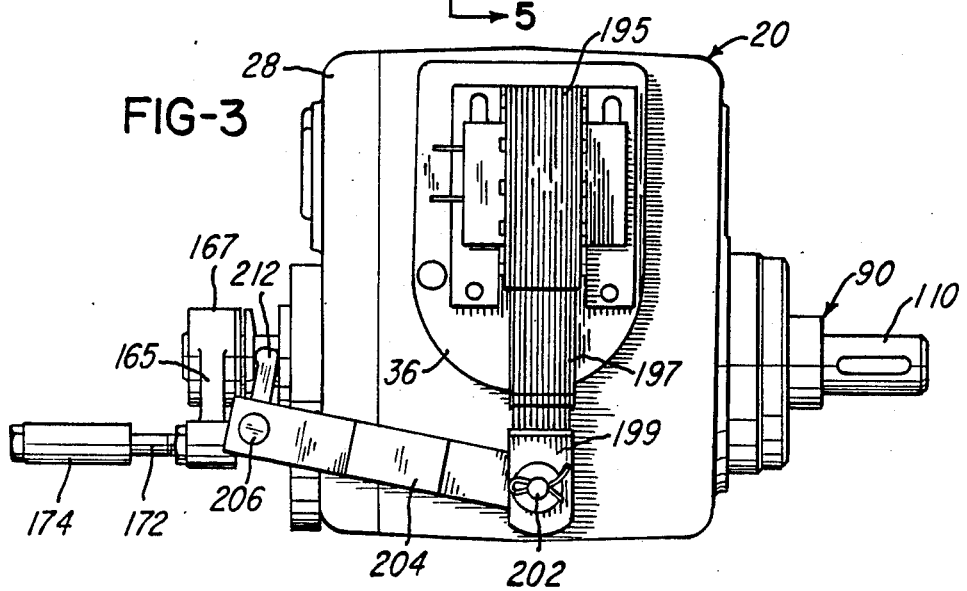

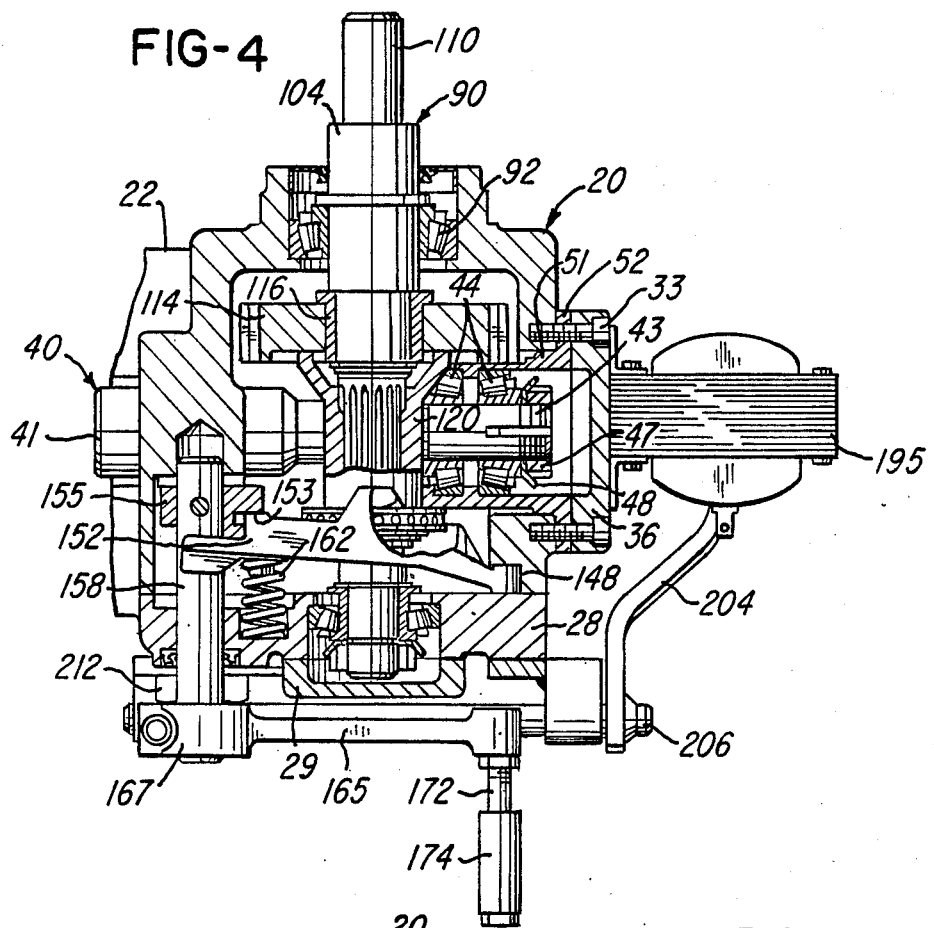
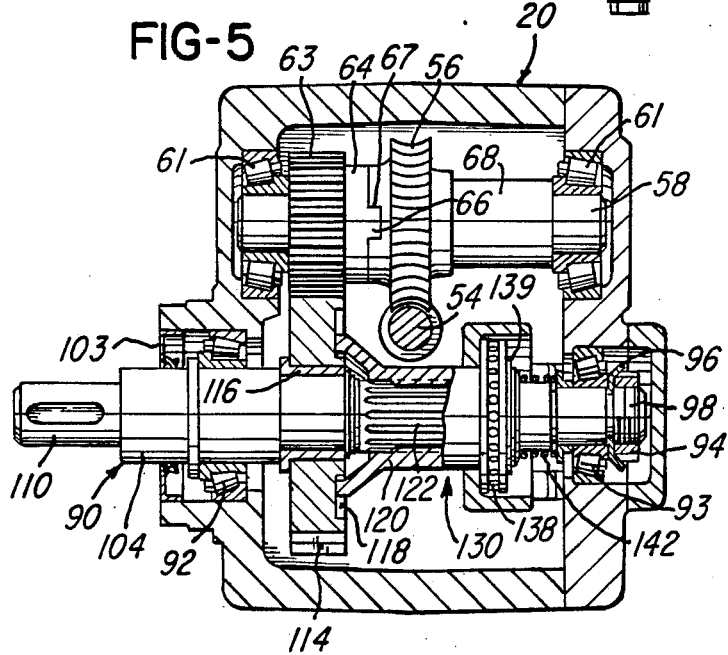

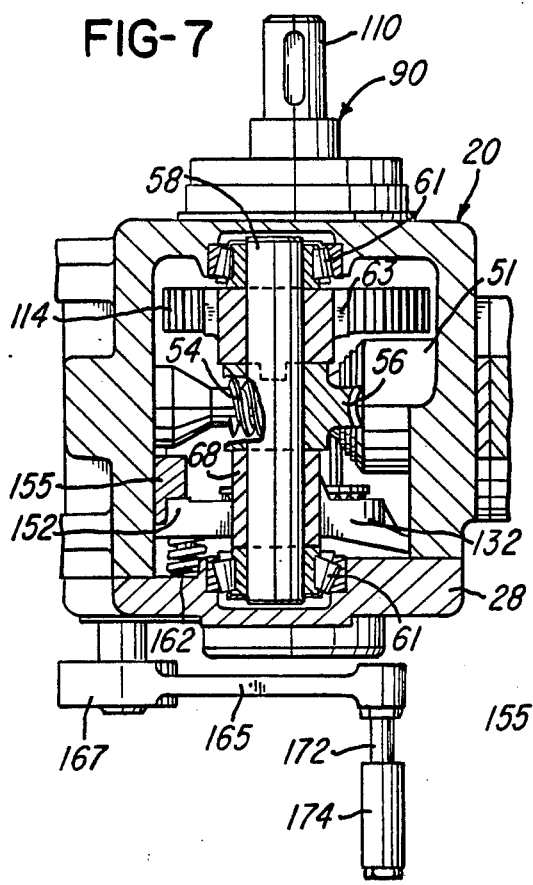
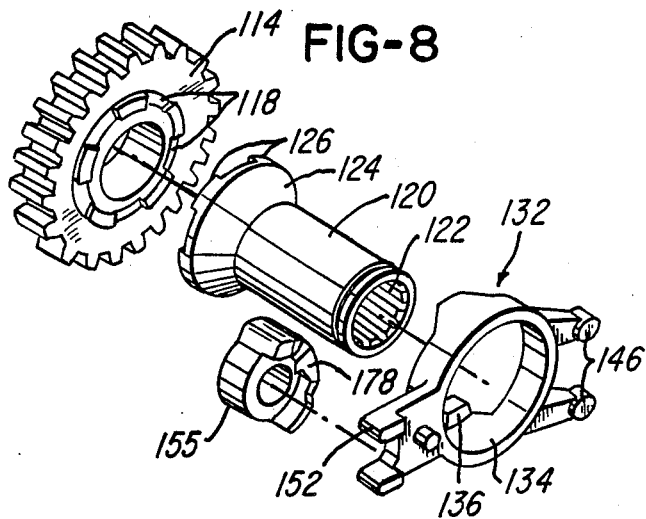
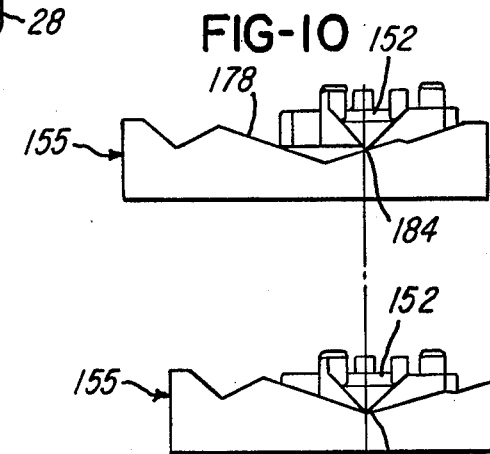
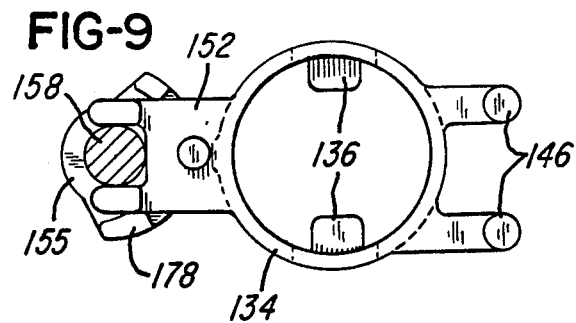
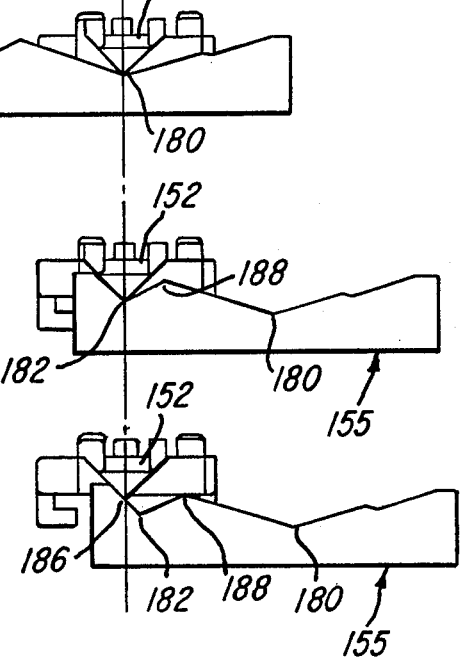

DRIVE UNIT FOR A MONORAIL CARRIER

BACKGROUND OF THE INVENTION

In an automated overhead monorail system, for example, of the type used in an automotive assembly plant, individually controlled trolleys or carriers are each driven by a drive unit which includes an electric motor and gearbox assembly having an output shaft. A friction drive wheel is mounted on the output shaft and engages the top of the monorail, and the gearbox may incorporate a clutch which is actuated by a forwardly projecting control shaft supporting a laterally projecting shift lever or arm. The arm engages projections or ramps on the monorail, and pivoting of the arm is effective to operate the clutch within the gearbox or actuate a switch which controls the electric motor.

In such a carrier drive unit, it is desirable to provide for positive engagement and disengagement of the clutch while the motor is running and while the drive unit is moving a substantial load supported by the carrier. It is also desirable for the clutch mechanism to provide for overtravel of the outwardly projecting shift arm in order to accommodate variations in the locations of the lever actuating ramps along the monorail. It is also desirable for the unit to incorporate an electrically actuated brake which quickly stops the drive motor shaft and also to provide for manually moving the carrier with little force when the clutch is disengaged. In addition, it is desirable for the gearbox to be driven by a standard electric motor and to provide for an extended and dependable service life with minimum down time for maintenance.

SUMMARY OF THE INVENTION

The present invention is directed to an improved drive unit for a monorail carrier and which provides all of the desirable features mentioned above. In addition, the drive unit of the invention provides for positive engagement and easy disengagement of the clutch while transmitting a substantial load and incorporates an electric brake with the gearbox housing so that a separate motor mounted electric brake is not required. When the clutch is disengaged and the carrier is manually moved, only the output shaft rotates with the friction drive wheel so that minimum effort is required to move the carrier.

The above advantages and features are generally provided by a drive unit which incorporates a housing supporting a horizontal input shaft and a horizontal output shaft arranged at right angles. The shafts are connected by two sets of reduction gears including a main drive gear supported for rotation on the output shaft. A clutch sleeve is splined to the output shaft for axial movement and has axially projecting straight sided dogs which releasably engage corresponding straight sided shoulders on the drive gear. The housing has an end bell portion which encloses an electric brake for the input shaft and is coupled by a standard mounting flange to an electric motor. A shift lever or arm is mounted on a control shaft which projects laterally into the housing parallel to the output shaft, and the shaft carries a rotary cam which pivots a clutch yoke for moving the clutch sleeve axially on the output shaft. The cam and yoke provide for overtravel of the control shaft and shift arm which carries a roller for engaging the actuating ramps on the monorail. The control shaft and cam are also moved axially in response to operation of a solenoid mounted on the housing when it is desired to provide electrical control of the clutch actuation between the engaged and disengaged positions.

Other features and advantages of the invention will be apparent from the following description, the accompanying drawings and the appended claims.

BRIEF DESCRIPTION OF THE DRAWINGS

FIG. 1 is a perspective view of a carrier drive unit constructed in accordance invention;

FIG. 2 is an elevational side view of the gearbox, clutch and brake unit shown in FIG. 1 and with an end cover removed;

FIG. 3 is an elevational front end view of the unit taken generally on the line 3—3 of FIG. 2;

FIG. 4 is a section taken generally on the line 4—4 of FIG. 2;

FIG. 5 is a section taken generally on the line 5—5 of FIG. 2;

FIG. 6 is a fragmentary section taken generally on the line 6—6 of FIG. 2;

FIG. 7 is a fragmentary section taken generally on the line 7—7 of FIG. 2;

FIG. 8 is a exploded perspective view of the clutch components used in the drive shown in FIGS. 1-7;

FIG. 9 is an elevation assembled view of two of the clutch components shown in FIG. 8; and FIG. 10 is a diagrammatic illustration showing the different positions of the clutch components shown in FIG. 9.

DESCRIPTION OF THE PREFERRED EMBODIMENT

FIG. 1 illustrates a monorail carrier drive unit 15 which includes a standard electric motor 16 having a motor shaft and a standard C-type mounting flange 17. For example, the motor 16 may have a rating of ¾ H.P. at 3600 R.P.M. such as manufactured by the Bodine Electric Company. The drive unit 15 also includes the cast metal housing 20 having an annular end bell portion 22 with an outwardly projecting C-flange motor mount 23 for supporting the motor 16 by a set of screws 24. The housing 20 is enclosed by a cast metal side cover plate 28 on which is mounted a cup-shaped bearing cover 29. The cover plate 28 is secured to the housing 20 by a set of screws 32, and the bearing cover 29 is secured by a set of screws 33. As shown in FIG. 4, another bearing cover 36 is secured to the housing 20 by another set of screws 33.

Referring to FIGS. 4 and 6, a horizontal input shaft 40 has a tubular end portion 41 (FIG. 6) which receives the shaft of the motor 16 and is secured for rotation with the motor shaft by a key (not shown). The input shaft 40 also has an inner end portion 43 (FIG. 4) which is supported by a set of anti-friction bearings 44 secured to the shaft portion 43 by a nut 47 and lock washer 48. The bearings 44 are retained by a sleeve 51 having an outwardly projecting flange 52 secured to the housing 20 by the bearing cover 36 and screws 33. The outer end portion of the input shaft 40 is supported for rotation by the motor shaft.

The input shaft 40 also includes a helical worm gear 54 (FIGS. 5 & 7) located between the shaft portions 41 and 43, and the worm gear 54 drives a helical gear 56 (FIG. 5) mounted on a cross shaft 58 located above the input shaft 40 and arranged at right angles. A set of tapered roller bearings 61 (FIG. 5) support opposite end portions of the shaft 58 and are retained within corresponding counterbores within the housing 20 and housing cover plate 28. A spur gear 63 is also mounted on the cross shaft 58 and has a hub portion 64 with diametrically opposed projections 66 having square corners. The projections 66 are received within correspondingly shaped recesses 67 formed within a mating hub portion of the worm gear 56 to provide a positive high torque drive connection between the gears 56 and 63. A sleeve 68 (FIG. 7) is mounted on the shaft 58 to locate the gears 56 and 63.

An annular electric brake 72 (FIG. 6) is located within the end bell portion 22 of the housing 20 around the tubular portion 41 of the input shaft 40. The brake 72 includes a mounting or support ring 74 which is secured to the housing 20 by peripherally spaced screws 76 and confines an annular coil 78 which receives electrical power through a pair of lead wires 79. A flat non-rotating armature plate 82 opposes a flat annular surface 84 on the housing 20, and an annular brake disk 86 is sandwiched between the plate 82 and surface 84. The disk 86 is splined to the input shaft portion 41 for rotation with the input shaft, and the brake 72 is normally engaged by a series of circumferentially spaced compression springs 88 which compress the plate 82 and rotatable disk 86 against the surface 84. When the coil 78 is energized, the plate 82 is retracted against the support ring 74 so that the brake disk 82 is free to rotate with the input shaft 40.

Referring to FIGS. 4 and 5, an output shaft 90 is supported for rotation by a set of tapered roller or anti-friction bearings 92 and 93 and is located below the shaft 58, also at right angles to the input shaft 40. The bearing 93 is secured to the shaft 90 by a nut 94 and lock washer 96 mounted on the end portion 98 of the output shaft. An oil sealing ring 103 (FIG. 5) surrounds the opposite end portion 104 of the output shaft 90, and another sealing ring 107 (FIG. 6) surrounds the tubular portion of the shaft 40. The output shaft 90 has an outer end portion 110 on which is mounted a drive wheel (not shown) having a resilient outer friction surface for riding on the top surface of the monorail.

A main drive gear 114 (FIG. 5) is rotatably supported by a bushing 116 mounted on a reduced portion of the output shaft 90, and the gear 114 meshes with the spur gear 63 driven by the worm gear 56. A set of circumferentially spaced recesses 118 (FIG. 8) are formed within one side of the gear 114, and a tubular clutch member or spool 120 is coupled to the output shaft 90 for axial movement by a spline 122 (FIG. 5). The clutch spool 120 has an enlarged annular end portion 124 (FIG. 8) which has circumferentially spaced and axially projecting straight sided lugs 126 forming part of a clutch 130. The clutch 130 is engaged when the lugs 126 project into the straight sided recesses 118 of the drive gear 114, as shown in FIG. 5. When the clutch is disengaged (not shown), the lugs 126 are retracted from the recesses 118 so that the output shaft is free to rotate independent of the gears 54, 56, 63 and 114.

The clutch 130 includes a mechanism for shifting the clutch spool 120 axially between its engaged and disengaged positions. This mechanism includes a clutch actuator 132 (FIGS. 4, 8 & 9) having a cylindrical portion 134 with a pair of diametrically opposed and inwardly projecting lugs 136. As shown in FIGS. 4 and 5, the lugs 136 engage an anti-friction thrust bearing 138 secured to one end portion of the clutch spool 120 by a retaining ring 139. A compression spring 142 (FIG. 5) surrounds the inner end portion of the output shaft 90 and normally urges the clutch spool 120 into positive engagement with the drive gear 114.

The clutch actuator 132 has a pair of pivot projections 146 (FIG. 8) which are retained for pivoting movement within corresponding cavities 148 (FIG. 4) formed within the housing 20 adjacent the cover plate 28. The clutch actuator 132 also includes a cam follower portion 152 (FIG. 8) having a V-shaped surface 153 (FIG. 4). The follower surface 153 engages a rotary cam 155 mounted on the inner end portion of a control shaft 158 supported for both rotary and axial movement by aligned holes within the housing 20 and housing cover plate 28. The clutch actuator portion 152 straddles the control shaft 158, and a compression spring 162 (FIG. 4) urges the follower surface 153 against the cam 155.

The control shaft 158 is supported on an axis parallel to the axis of the output shaft 90, and a shift lever or arm 165 is secured or clamped to the outwardly projecting end portion of the control shaft 158 by a split hub portion 167. A shaft or bolt 172 (FIG. 4) is secured to the outer end portion of the shift lever 165 and has an axis parallel to the axis of the control shaft 158 and to the axis of the output shaft 90. The bolt 172 supports a nylon roller 174 which is adapted to engage actuating ramps on the monorail support system when it is desired to disengage the clutch 130.

Referring to FIG. 10, the rotary cam 155 has an arcuately extending and axially facing cam surface 178 which defines an engaged position 180 and a disengaged position 182. As shown by the top and bottom views of FIG. 10, the cam surface 178 also provides an engaged over-travel position 184 and a disengaged over-travel position 186. The cam surface 178 also has an over-center peak 188 located between the engaged position 180 and disengaged position 182 so that the clutch 130 is normally retained in its engaged position or its disengaged position by the force exerted by the spring 162.

As explained above, the pivoting of the shift arm 165 is effective to provide for mechanical actuation of the clutch 130 between its engaged and disengaged position. Sometimes, it is also desirable to provide for electrical actuation of the clutch 13D. To provide this feature, an electrically actuated solenoid 195 (FIGS. 2 and 4) is mounted on the cover plate 36 and has a downwardly projecting retractable armature 197. A yoke 199 (FIG. 2) and a pivot pin 202 connect the armature 197 to a lever 204 mounted on one end portion of a horizontal actuator shaft 206. The shaft 206 is rotatably supported by a set of bearing blocks 208 (FIG. 4) and 209 (FIG. 2) mounted on the housing cover plate 28.

A U-shaped yoke portion 212 (FIG. 4) is secured to the shaft 206 adjacent to the bearing block 209 and projects upwardly to receive the control shaft 158 adjacent the mounting clamp portion 167 of the shift arm 165. It is apparent that when the solenoid 195 is energized and the armature 197 is retracted, the rod 206 is rotated for shifting the control rod 158 and cam 155 axially outwardly so that the actuator 132 disengages the clutch spool 120 from the drive gear 114. As shown in FIGS. 2 & 4, the solenoid 195 is de-energized so that the clutch spool 128 shifts axially between engagement and disengagement in response to rotation of the cam 155 with the control shaft 158 and shift arm 165. As shown in FIG. 1, the solenoid 195 is covered by a sheet metal housing 215.

From the drawings and the above description, it is apparent that a monorail carrier drive unit constructed in accordance with the present invention, provides desirable features and advantages. For example, the clutch 130 provides for engagement by the spring 142 and disengagement by pivoting of the clutch actuator 132. This permits engagement and disengagement of the clutch 130 while the motor 16 is running, and the square cornered dogs 126 and mating recesses 118 assure either positive engagement of the clutch or positive disengagement. The rotary cam 155 and actuator 132 also provide for over-travel of the shift arm 165 both after engagement and after disengagement so that the roller 174 will accommodate variations in the actuating ramps on the supporting monorail.

The spline connection 122 of the clutch spool 120 also permits easy axial movement of the clutch spool on the output shaft 90 so that the clutch may be easily disengaged under load. In addition, the lateral projection of the control shaft 162 and the roller 174 is desirable for dependable operation of the drive unit 15 and for accommodating variations in the locations of the actuating ramps and to prevent jambs. As another feature, the incorporation of the electric brake 72 provides for using the housing 20 to form the braking surface 84 and for using a standard and commercially available electrical motor 16.

Also, the solenoid 195 and the actuating rod or shaft 206 and yoke 212 provide for an optional electrical control over the operation of the clutch 130, which is desirable in some monorail systems. The spur gears 63 and 114 may also be interchanged with other mating gears of different sizes to provide for selecting different gear reductions, for example, from 11.7:1 to 45:1. It is also apparent that when the clutch 130 is disengaged, the output shaft 90 is free to rotate so that the carriage may be manually moved along the monorail without reverse driving the unit 15.

While the form of the drive unit herein described constitutes a preferred embodiment of the invention, it is to be understood that the invention is not limited to this precise form of drive unit, and that changes may be made therein without departing from the scope and spirit of the invention as defined in the appended claims.

The invention having thus been described, the following is claimed:

1. A drive unit adapted for moving a carrier tractor of an automated monorail system, said unit comprising a housing, an input shaft supported by said housing for rotation on a first axis, an output shaft supported by said housing for rotation on a second axis transverse to said first axis, an electric motor having a motor shaft, means for connecting said housing to said electric motor and for connecting said motor shaft to said input shaft, a set of reduction gears connecting said input shaft to said output shaft, clutch means connecting said set of gears to said output shaft and being movable between an engaged position and a disengaged position, a control shaft supported by said housing for rotation on an axis generally parallel to said axis of said output shaft, cam actuated means for moving said clutch means between said engaged and disengaged positions in response to rotation of said control shaft, said cam actuated means including a rotary cam member mounted on said control shaft within said housing, a shift lever mounted on said control shaft outwardly of said housing, means for moving said shift lever to effect rotation of said control shaft and said cam member to effect operation of said clutch means between said engaged an disengaged positions, and said cam member including overtravel portions providing for rotation of said control shaft and said shift lever to overtravel positions beyond said engaged an disengaged positions of said clutch means.

2. A drive unit as defined in claim 1 and including spring means for biasing said cam actuated means from said overtravel positions to corresponding said engaged and disengaged positions.

3. A drive unit adapted for moving a carrier tractor of an automated monorail system, said unit comprising a housing, an input shaft supported by said housing for rotation on a first axis, an output shaft supported by said housing for rotation on a second axis transverse to said first axis, an electric motor having a motor shaft, means for connecting said housing to said electric motor and for connecting said motor shaft to said input shaft, a set of reduction gears connecting said input shaft to said output shaft, clutch means connecting said set of gears to said output shaft and being movable between an engaged position and a disengaged position, a control shaft supported by said housing for rotation on an axis generally parallel to said axis of said output shaft, cam actuated means for moving said clutch means between said engaged and disengaged positions in response to rotation of said control shaft, said cam actuated means including a rotary cam member mounted on said control shaft within said housing, a shift lever mounted on said control shaft outwardly of said housing, means for moving said shift lever to effect rotation of said control shaft and said cam member to effect operation of said clutch means between said engaged an disengaged positions, an electrically actuated solenoid supported by said housing and having a movable armature, and actuating means including an actuating member supported for moving said control shaft and said cam member axially in response to actuation of said solenoid.

4. A drive unit adapted for moving a carrier tractor on an automated monorail system, said unit comprising a gearbox housing, an input shaft supported by said housing for rotation on a first axis, an output shaft supported by said housing for rotation on a second axis transverse to said first axis, an electric motor having a motor shaft, means for connecting said housing to said electric motor and for connecting said motor shaft to said input shaft, a set of reduction gears connecting said input shaft to said output shaft, clutch means connecting said set of gears to said output shaft and being movable between an engaged position and a disengaged position, a control shaft supported by said housing for rotation on an axis generally parallel to said axis of said output shaft, cam actuated means for moving said clutch means between said engaged and disengaged positions in response to rotation of said control shaft, said cam actuated means including a rotary cam member mounted on said control shaft within said housing, a shift lever mounted on said control shaft outwardly of said housing, means for moving said shift lever to effect rotation of said control shaft and said cam member to effect operation of said clutch means between said engaged an disengaged positions, an electrically actuated annular brake unit mounted on said gearbox housing between motor and said housing and surrounding said input shaft, said brake unit including an annular brake pad secured for rotation with said input shaft, and said gearbox housing including means forming an annular breaking surface for resisting rotation of said brake pad.

5. A drive unit adapted for moving a carrier tractor of an automated monorail system, said unit comprising a housing, an input shaft supported by said housing for rotation on a first axis, an output shaft supported by said housing for rotation on a second axis transverse to said first axis, an electric motor having a motor shaft, means for connecting said housing to said electric motor and for connecting said motor shaft to said input shaft, a set of reduction gears connecting said input shaft to said output shaft, clutch means connecting said set of gears to said output shaft and being movable between an engaged position and a disengaged position, a control shaft supported by said housing for rotation on an axis generally parallel to said axis of said output shaft, cam actuated means for moving said clutch means between said engaged and disengaged positions in response to rotation of said control shaft, said cam actuated means including a rotary cam member mounted on said control shaft within said housing, a shift lever mounted on said control shaft outwardly of said housing, means for moving said shift lever to effect rotation of said control shaft and said cam member to effect operation of said clutch means between said engaged an disengaged positions, said set of gears including a worm gear on said input shaft, a main drive gear supported by said output shaft for relative rotation, a set of gears mounted on a third shaft extending parallel to said output shaft and connecting said worm gear to said main drive gear, said clutch means including a tubular clutch member mounted to said output shaft, spline means connecting said clutch member to said output shaft and providing for axial movement of said clutch member on said output shaft, and said clutch member and said main drive gear including axially projecting lugs and corresponding recesses for connecting said main drive gear to said output shaft when said clutch means is in said engaged position.

6. A drive unit as defined in claim 5 wherein each of said lugs and said recesses has square corners to effect positive engagement of said clutch means.

7. A drive unit adapted for moving a carrier tractor of an automated monorail system, said unit comprising a housing, an input shaft supported by said housing for rotation on a first axis, an output shaft supported by said housing for rotation on a second axis disposed at a right angle with respect to said first axis, an electric motor having a motor shaft, means for connecting said housing in said electric motor and for connecting said motor shaft to said input shaft, a set of reduction gears connecting said input shaft to said output shaft, clutch means connecting said set of gears to said output shaft and including a clutch sleeve splined to said output shaft for movement between an engaged position and a disengaged position, a control shaft supported by said housing for rotation on an axis parallel to said axis of said output shaft, cam actuated means for moving said clutch means between said engaged and disengaged positions in response to rotation of said control shaft, said cam actuated means including a rotary cam member mounted on said control shaft within said housing, a cam follower connected to move said clutch sleeve in response to rotation of said cam member, actuator means mounted on said control shaft outwardly of said housing, means for moving said actuator means to effect rotation of said control shaft and said cam member to effect axial movement of said clutch sleeve between said engaged and disengaged positions, and said cam member including overtravel portions providing for rotation of said control shaft and said cam member to overtravel positions beyond said engaged and disengaged positions of said clutch sleeve.

8. A drive unit as defined in claim 7 and including spring means for biasing said cam actuated means from said overtravel positions to corresponding said engaged and disengaged positions, and said cam member includes means providing for an overcenter action between said engaged and disengaged positions.

9. A drive unit as defined in claim 7 and including an electrically actuated solenoid supported by said housing and having a movable armature, and actuating means for moving said control shaft and said cam member in response to movement of said armature.

10. A drive unit as defined in claim 9 wherein said actuating means for moving said control shaft include an actuating member supported for moving said control shaft and said cam member axially in response to actuation of said solenoid.

11. A drive unit as defined in claim 7 and including an electrically actuated annular brake unit mounted on said housing and surrounding said input shaft, said brake unit including an annular brake pad secured for rotation with said input shaft, and said housing including means forming an annular braking surface for resisting rotation of said brake pad.

12. A drive unit as defined in claim 7 wherein said set of gears include a worm gear on said input shaft, a main drive gear supported by said output shaft for relative rotation, and a set of gears mounted on a third shaft extending parallel to said output shaft and connecting said worm gear to said main drive gear.

13. A drive unit adapted for moving a carrier tractor of an automated monorail system, said unit comprising a housing, an input shaft supported by said housing for rotation on a first axis, an output shaft supported by said housing for rotation on a second axis, an electric motor having a motor shaft, means for connecting said housing to said electric motor and for connecting said motor shaft to said input shaft, a set of reduction gears connecting said input shaft to said output shaft, clutch means connecting said set of gears to said output shaft and being movable between an engaged position and a disengaged position, a control shaft supported for movement by said housing, means for moving said clutch means between said engaged and disengaged positions in response to movement of said control shaft, a shift lever mounted on said control shaft outwardly of said housing, means for moving said shift lever to effect movement of said control shaft to effect operation of said clutch means between said engaged and disengaged positions, an electrically actuated solenoid supported by said housing and having a movable armature, actuating means for moving said control shaft in response to movement of said armature, and said actuating means including an actuating member supported for moving said control shaft axially in response in actuation of said solenoid.

14. A drive unit adapted for moving a carrier tractor of an automated monorail system, said unit comprising a gearbox housing, an input shaft supported by said housing for rotation on a first axis, an output shaft supported by said housing for rotation on a second axis, an electric motor having a motor shaft, means for connecting said housing to said electric motor and for connecting said motor shaft to said input shaft, a set of reduction gears connecting said input shaft to said output shaft, clutch means connecting said set of gears to said output shaft and being movable between an engaged position and a disengaged position, a control shaft supported for movement by said housing, means for moving said clutch means between said engaged and disengaged positions in response to movement of said control shaft, a shift lever mounted on said control shaft outwardly of said housing, means for moving said shift lever to effect movement of said control shaft to effect operation of said clutch means between said engaged and disengaged positions, an electrically actuated annular brake unit mounted between said housing and said motor and surrounding said input shaft, said brake unit including an annular brake pad secured for rotation with said input shaft, and said gearbox housing including means forming an annular braking surface for resisting rotation of said brake pad.

* * * * *